United States Patent
Krummrich et al.

(10) Patent No.: US 6,452,722 B1
(45) Date of Patent: Sep. 17, 2002

(54) OPTICAL AMPLIFIER WITH AUTOMATIC LEVEL CONTROL AND AUTOMATIC GAIN CONTROL

(75) Inventors: Peter Krummrich, München; Claus-Jörg Weiske, Fürstenfeldbruck; Martin Schreiblehner; Wolgang Mader, both of Wein, all of (DE)

(73) Assignee: Siemens Aktiengesellschaft, Münich (DE)

(*) Notice: Subject to any disclaimer, the term of this patent is extended or adjusted under 35 U.S.C. 154(b) by 0 days.

(21) Appl. No.: 09/530,190
(22) PCT Filed: Mar. 30, 1999
(86) PCT No.: PCT/DE99/00963
§ 371 (c)(1), (2), (4) Date: Apr. 25, 2000
(87) PCT Pub. No.: WO00/13313
PCT Pub. Date: Mar. 9, 2000

(30) Foreign Application Priority Data

Aug. 26, 1998 (DE) .......................... 198 38 788

(51) Int. Cl.[7] .............................................. H01S 3/00
(52) U.S. Cl. ........................... 359/341.41; 359/341.42; 359/337
(58) Field of Search ............... 372/6, 29.021, 372/194, 337, 341, 341.41, 341.42

(56) References Cited

U.S. PATENT DOCUMENTS

| 5,446,812 | A | | 8/1995 | Hirst ........................ 385/24 |
| 6,025,947 | A | * | 2/2000 | Sugaya et al. ............... 359/160 |
| 6,038,063 | A | * | 3/2000 | Tsuda et al. ................ 356/341 |
| 6,091,539 | A | * | 7/2000 | Kosaka ....................... 356/341 |
| 6,163,399 | A | * | 12/2000 | Berg .......................... 359/341 |
| 6,166,850 | A | * | 12/2000 | Roberts et al. ............... 359/341 |
| 6,348,987 | B1 | * | 2/2002 | Tomofuji ..................... 359/124 |

FOREIGN PATENT DOCUMENTS

| DE | 23 01 945 | 4/1982 | ............ G01C/3/08 |
| DE | 42 40 029 | 6/1994 | ............ H04B/10/12 |
| FR | 2 759 831 | 8/1998 | ............ H04B/10/16 |
| JP | 04 293025 | 10/1992 | ............ G02F/1/35 |
| JP | 05 063643 | 3/1993 | ............ H04B/10/16 |
| JP | 10 190107 | 7/1998 | ............ H01S/3/10 |
| WO | WO 98/28826 | 7/1998 | ............ H01S/3/06 |

OTHER PUBLICATIONS

Electronics Letters, Mar. 28, 1991, vol. 27, No. 7, "Gain Control in Erbium–Doped Fibre Amplifiers by an All–Optical Feedback Loop", pp. 560–561.

Electronics Letters, Jun. 9, 1994, vol. 30, No. 12, "1480 nm pumped erbium doped fibre amplifier with all optical automatic gain control", pp. 962–964.

ECOC 97, Sep. 22–25, 1997, Conf. Publ. No. 448, Dynamic performance of the All–Optical Gain–Controlled EDFA Cascade in Multi–Wavelength Add/Drop Networks, pp. 139–142.

ECOC 96, Oslo 22nd European Conf. on Optical communication, J. L. Zyskind, et al., Fast Link Control Protection for Surviving Channels in Multowavelength Optical Networks, pp. 5.49–5.52.

AT & T Laboratories, A.K. Srivastava et al., "Fast Gain Control in an Erbium–Doped Fiber Amplifier", pp. 4–2 thru 4–5.

* cited by examiner

Primary Examiner—Thomas H. Tarcza
Assistant Examiner—Deandra M. Hughs
(74) Attorney, Agent, or Firm—Schiff Hardin & Waite

(57) ABSTRACT

Regulated optical amplifiers for wavelength-division multiplex signal transmission that include a first control device for regulating the gain and a second, dominating control device having a significantly slower control behavior for regulating the output power level in conformity with a supplied rated power value. Both rapid level changes as well as slow changes in attenuation of the transmission path can be leveled with a transmission path utilizing these amplifiers.

5 Claims, 3 Drawing Sheets

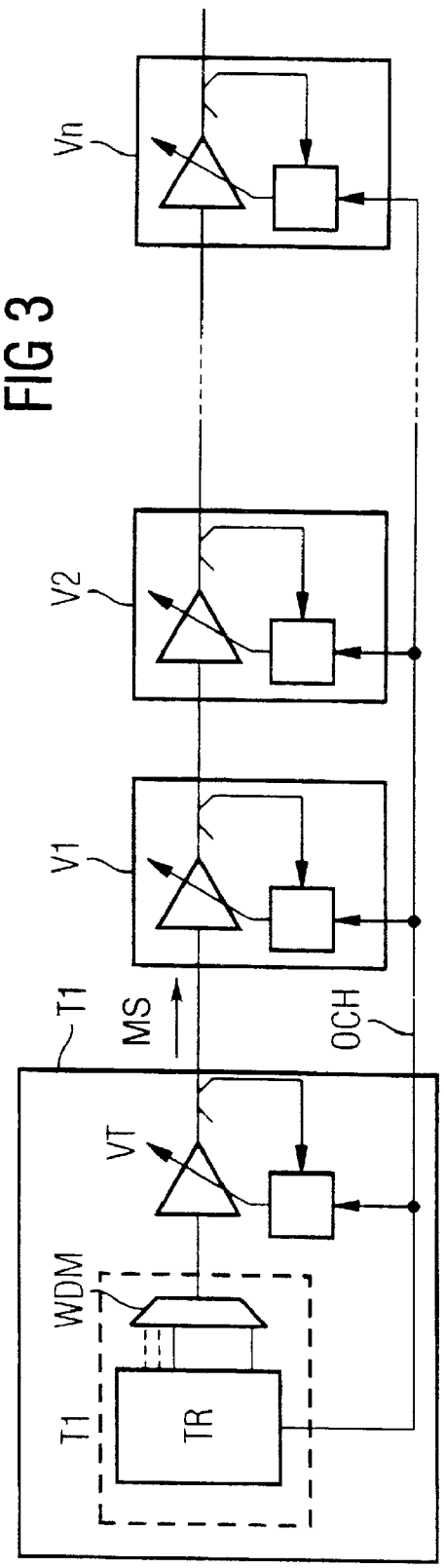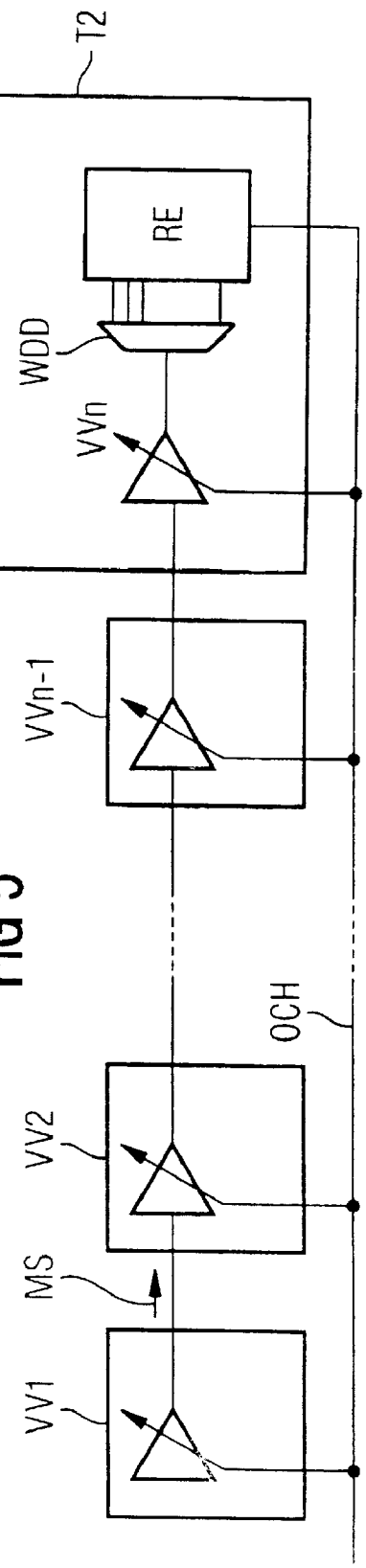

OPTICAL AMPLIFIER WITH AUTOMATIC LEVEL CONTROL AND AUTOMATIC GAIN CONTROL

The invention is directed to regulated optical amplifiers and optical transmission paths wherein these amplifiers are utilized.

Optical amplifiers are utilized in optical transmission networks as compensation for the fibre attenuation. A stable operation over further transmission paths, however, is only possible when modifications of the system parameters are compensated with the assistance of controls. The aggregate output powers of the amplifiers are regulated in previously employed wavelength-division multiplex (WDM) transmission systems. Given single-channel systems or paths having a constant number of channels, slow changes of the system parameters, such as changes due to temperature fluctuation or aging, are compensated rather well with this control concept.

When, however, the number of channels changes during operation, then aggregate output power regulation changes the levels of the individual WDM transmission channels. Such a level change can be fundamentally avoided by identifying the active channels and informing the control devices of the individual optical-amplifiers of the active channels identified. The control devices correspondingly adapt the rated value for the output level of the amplifier. Due to the different time constants, however, this level matching does not usually succeed without brief-duration fluctuations with which are connected considerable losses of transmission quality.

Another possible solution is comprised in regulating the individual amplifiers to constant gain (amplification). Such amplifiers are described in "Electronic Letters", Mar. 26, 1991, Vol. 27, No. 7, pages 560–561 and in "Electronic Letters" Jun. 9, 1994, Vol. 30, No. 12, pages 962–964. In these circuits, the level fluctuations of the remaining channels' given a change in the number of active channels' are suppressed by keeping the gain constant. However, this control principle is also not suitable as a control concept for a transmission path having a plurality of amplifiers because slow changes in the path parameter accumulate and deterioration of the transmission quality results.

SUMMARY OF THE INVENTION

It is therefore an object of the invention to specify suitable amplifiers for optical transmission networks. Moreover, the transmission paths are to be fashioned such that the reception levels of the individual WDM channels remain constant even given a change in the number of channels.

This and other objects are achieved by a regulated optical amplifier circuit for use in wavelength-division multiplex signal transmission having an optical amplifier, a first control portion and a second control portion. The first control portion is configured to regulate the gain of the optical amplifier. Control behavior of the second control portion is significantly lower than the first control portion and the second control portion is configured to regulate an output power level of the optical amplifier according to an input reference value.

According to another aspect of the present invention, a regulated optical amplifier circuit includes an optical amplifier, a first control portion configured to regulate the gain of the optical amplifier and an input control device for inputting the rated value to the first control portion. The input of the rated value to the first control portion by the input control device is effected in order to set the gain of the optical amplifier. Additionally, the input control device receives a reference value and is configured to regulate power output of the optical amplifier by inputting a particular rated value input based on the received reference value.

In yet another aspect of the present invention, a transmission path for wavelength-division multiplex signals includes a plurality of amplifiers connected in a concatenated fashion and an input line for supplying a reference value to the plurality of amplifiers. The reference value is configured to respectively determine and desire output level for each of the plurality of amplifiers. Furthermore, each of the plurality of amplifiers includes a corresponding control device configured to adjust a respective gain of the corresponding amplifier in response to the supplied reference value.

An advantage of the inventive optical amplifier is that the gain regulation in the first control circuit works with a short time constant. Changes in the number of active WDM channels therefore have only a minimum effect on the output level. The second control circuit ensures that slow changes are leveled out. Given a change in the plurality of active channels, a corresponding change of the rated value of the second control circuit is effected on the basis of a local terminal inserted into the transmission path at the transmitter side or on the basis of a terminal (network node) of the reception side, so that the output level control is perceptible for only a brief-duration and minimally, if at all.

When a storage element is provided in the second control circuit, then it is possible to have this control circuit take effect only at specific times in order to modify the reception level or to deactivate it during a change in the number of channels.

In an alternative solution, the regulation of the output power either is effected in common for all amplifiers of a transmission path proceeding from the reception terminal or, given a corresponding, individual monitoring of the output levels, also separately via a correspondingly fashioned monitoring channel.

Due to the employment of an output level regulation, the amplifiers need only receive information about the plurality of WDM channels or a corresponding rated value.

The transmission paths equipped with these amplifiers can also level out slow changes in amplification caused by aging processes.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combination particularly pointed out in the appended claims.

BRIEF DESCRIPTION OF THE DRAWINGS

Reference is made to the attached drawings, wherein elements having the same reference designations represent like elements throughout and wherein:

FIG. 3 illustrates a transmission path having a plurality of amplifiers;

FIG. 5 illustrates the use of the amplifier on a transmission path.

DETAILED DESCRIPTION OF THE PREFERRED EMBODIMENTS

Figure 1:
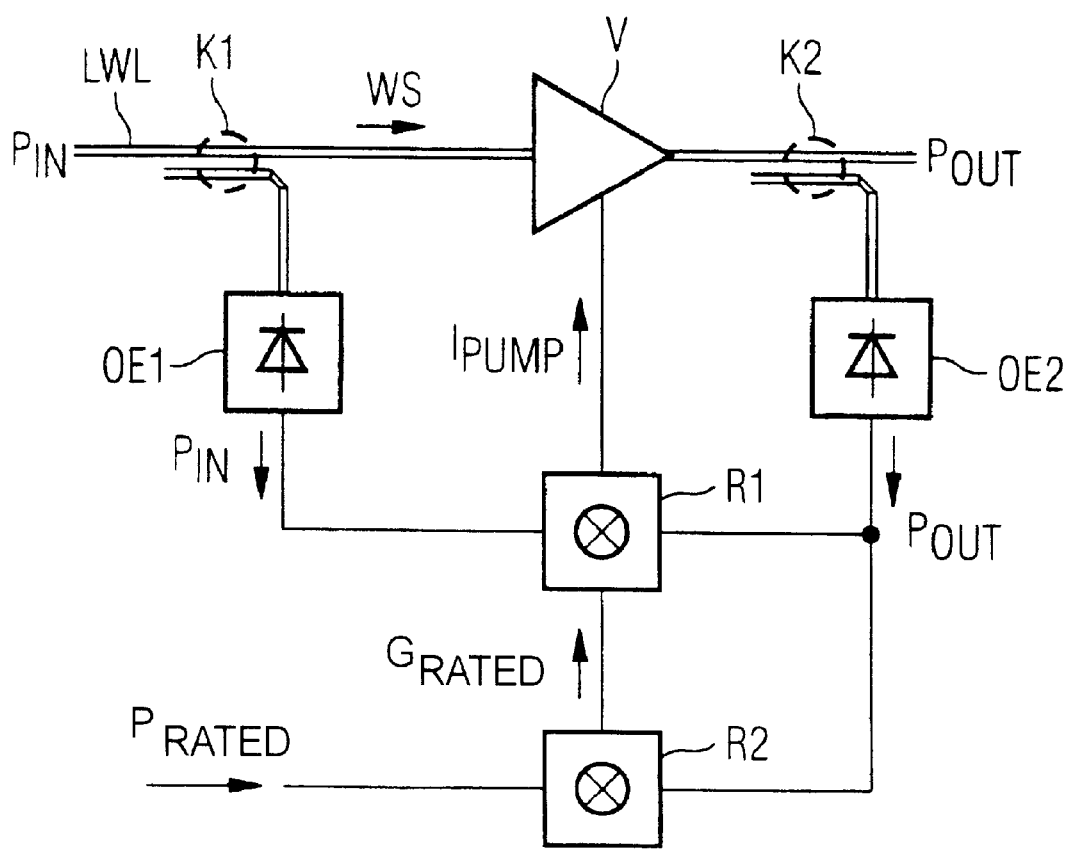
FIG. 1 is a schematic circuit diagram of the inventive amplifier with regulation of the output power.

An exemplary embodiment of the invention is shown as a schematic circuit diagram in FIG. 1. An optical amplifier V serves for the amplification of a wavelength-division multiplex signal WS transmitted via a light waveguide LWL. A first measuring coupler K1, which branches a part of the signal off, is provided at the input side. This part of the signal is converted by a first optoelectronic transducer OE1 into an electrical measured signal $p_{IN}$ corresponding to the input level (input aggregate power) $P_{IN}$, and the measured signal $p_{IN}$ is supplied to a first regulator R1. A measured signal $p_{OUT}$ is likewise acquired via a second measuring coupler K2 and a second optoelectronic transducer OE2, this second measured signal $p_{OUT}$ corresponding to the output power $P_{OUT}$ and being likewise supplied to the first regulator. Dependent on the (adjustable relationship) $P_{OUT}$ to $P_{IN}$, for example, the pump current $I_{PUMP}$ is regulated given a fiber amplifier or, the control current is regulated given a semiconductor amplifier. Other principles of gain control can likewise be employed, such as those described in the previously cited references. for example In addition to a first control means (control circuit) (K1, OE1, K2, OE2, R1, V) serving the purpose of a rapid gain control and shown in simplified fashion, a second, dominating control means (control circuit K2, OE2, R2, R1, V) is provided, this regulating the output power (output level) $P_{OUT}$ by comparing the corresponding measured value $p_{OUT}$ to a reference input, the rated value $p_{RATED}$. Slow changes of the transmission attenuation caused, for example, by temperature modification or aging are leveled by this second control circuit. The manipulated variable $G_{RATED}$ output by the second regulator R2 defines the pump current $I_{pump}$ by intervening in the first control circuit and, thus, defines the gain of the optical amplifier V. Given changes in the number of transmission channels, the gain should not change. The level regulation therefore should not take effect immediately, this being capable of being achieved by a far higher time constant of the second control circuit, as a rule, compared to the time constant of the first control circuit.

Figure 2:
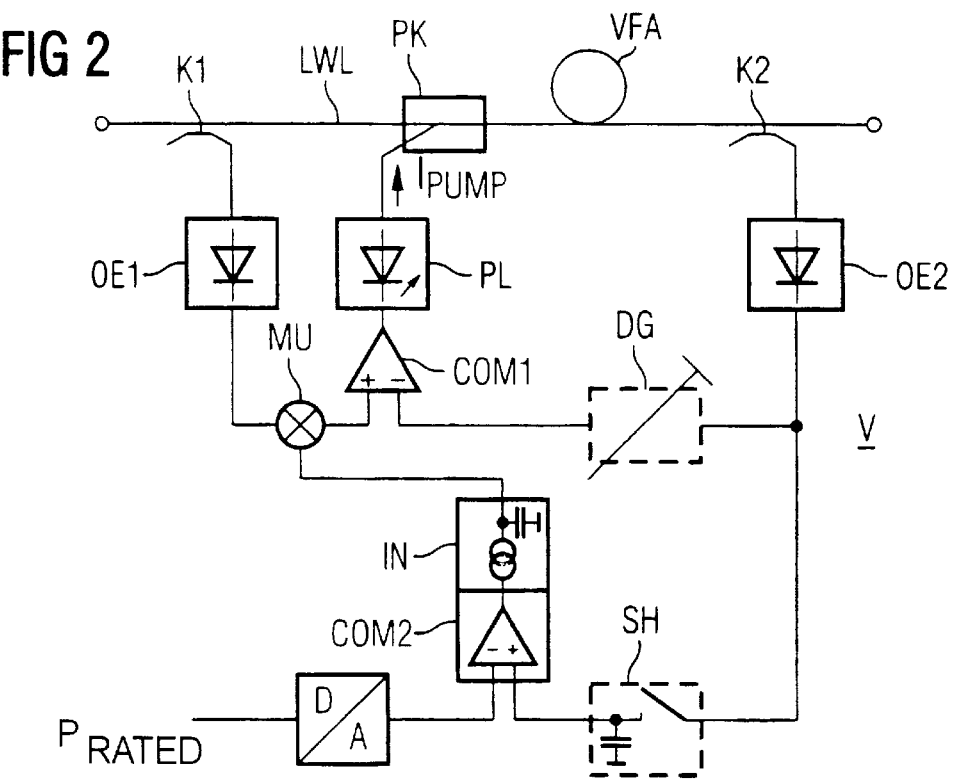
FIG. 2 is a schematic circuit diagram having a fiber amplifier.

FIG. 2 shows details of the amplifier circuit (version V) with a fiber amplifier VFA whose gain is defined by the pump current $I_{PUMP}$ generated by a controlled pump laser PL, this being fed in via a pump coupler PK. The first regulator R1 may comprise an attenuation element DG that is connected to the second opto electrical transducer OE2 and a first comparator COM1. When the second control circuit is left out of consideration, then the gain can be set with the attenuation element DG. One possibility for "output level regulation by modification of the gain" would be the direct change of the attenuation element DG by the reference input $p_{RATED}$.

As already fundamentally described, the comparison between the output power and the reference input $P_{RATED}$ in the exemplary embodiment ensues in a second comparator COM2 in the second control means (in the second control circuit) K2, OE2, COM2, IN, MU, COM1, PL, PK, VFA). Via the multiplier MU, the result of this comparison changes the input signal of the first comparator COM1 and thus controls the pump current and, thus, the gain of the fiber amplifier VFA. The attenuation element can be foregone since the second control circuit determines the gain via the multiplier.

As already mentioned, when the number of channels is changed, the time constant in the second control circuit should be sufficiently large to be able to neutralize the influence of the changed number of channels on the basis of a corresponding externally implemented change of the reference input. A storage element SH can likewise contribute to externally implement change of the reference input thereto. This can also be inserted between the integrator IN and the multiplier MU. A range for the time constant of the first control circuit from approximately 1 microsecond up to 1 millisecond is adequate given high data rates in the megabits per second range, and a range for the time constant of the second control means from approximately 0.1 seconds over several seconds and minutes up to hours is expedient. The time constant can also be switched for different operating conditions. During initialization, for example, a low time constant of, 100 microseconds can be selected. A time constant of 1 second can be selected after a change in the number of channels; and a time constant of several minutes can be expedient given a level change.

The second comparator COM2 and the integrator IN can be combined into one circuit embodiment to provide dead time (i.e., slow time constant). The amplifier circuits with the corresponding control circuits can, of course, be constructed in any desired way.

FIG. 3 shows a transmission path with a plurality of optical amplifiers VT, VI through Vn. A wavelength-division multiplex signal MS is generated in a transmission terminal T1 by a transmission means TR and then multiplexed by wavelength-division multiplex WDM, amplified in an optical amplifier VT and supplied into the path. The amplifiers are set such that they respectively supply output levels corresponding to the conditions of the respective path section, these likewise being maintained by the second control circuit even given slowly changing transmission properties.

When the plurality of WDM channels is varied, then the output level in each channel continues to be held constant at first by the first control circuit. Due to the slow time constant/dead time, the output level regulation does not initially intervene in the regulation process. Since the amplifiers are simultaneously informed of the change of the reference input by the transmission terminal T1 via a monitoring channel OCH, this change of the reference input serving for setting the new output level, practically no influence due to the second control circuit occurs. A separate monitoring of the number of channels allocated to each amplifier is still too complex compared thereto.

It should also be added that the output powers can also be individually adjustable via the monitoring channel.

Figure 4:
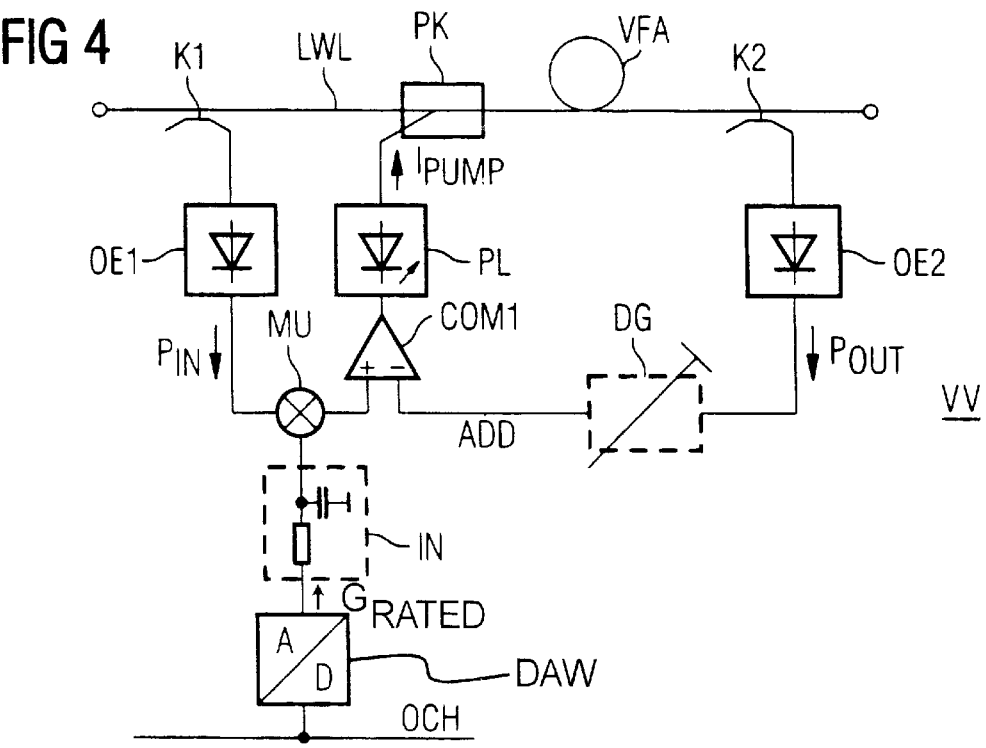
FIG. 4 shows a schematic of the amplifier according to an embodiment of the invention.

FIG. 4 shows a version VV of the amplifier according to an embodiment of the present invention. The second regulating means for direct regulation of the output level is lacking. Instead, the gain can only be set via the monitoring channel OCH in order to then be kept constant by the first control circuit. In turn, an external modification of the output level is also possible. In this example, the setting is effected via a digital-to-analog converter DAW whose output signal determines the gain as control signal $G_{RATED}$.

FIG. 5 shows a further transmission path having optical amplifiers VV1 through VVn wherein this type of amplifier shown in FIG. 4 can be advantageously utilized. A terminal T2 on the reception side, in addition to containing an amplifier VVn and a wavelength-division demultiplexer WDD, contains a reception means RE that determines the aggregate level and the number of active WDM channels. Proceeding from the second terminal, the numbers of channels corresponding rated values are communicated to the amplifiers via the transmission channel OCH, as is the extent to which the gain of the individual amplifiers is varied as well given system-induced, slow changes of the reception level. The second "control circuit" is thus always formed via the reception terminal T2. Given simple embodiments of the setting device and of the amplifiers, identical variations in gain can be undertaken for all amplifiers; Given more complicated embodiments, individual variations at individual amplifiers can be undertaken according to the path parameters or can be accordingly undertaken by monitoring devices. The output levels can also be directly identified or be modified in relationship to preset levels on the basis of corresponding regulators.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A regulated optical amplifier circuit for use in wavelength-division multiplex signal transmission comprising:

an optical amplifier;

a first control portion configured to regulate the gain of the optical amplifier; and a second control portion having a control behavior significantly slower than the first control portion and configured to regulate an output power level of the optical amplifier according to an input reference value.

2. The regulated optical amplifier circuit of claim 1, wherein the first control portion includes the optical amplifier, a first opto-electrical transducer connected to an output of the optical amplifier and a first comparator receiving an input measured signal from a second opto-electrical transducer, the input measured signal corresponding to an input power level of the amplifier circuit; and wherein the second control portion also includes the optical amplifier and the first opto-electrical transducer connected to the output of the optical amplifier, a second comparator receiving the input reference value and a multiplier connected to the second opto-electrical transducer and the first comparator, the multiplier also receiving an input from an output of the second comparator and outputting a multiplied value to the first comparator.

3. The regulated optical amplifier of claim 1, wherein the optical amplifier is a fiber amplifier receiving a controlling pump current that is controlled by the first and second control portions.

4. The regulated optical amplifier of claim 1, wherein the second control portion is comprised of integrated components.

5. The regulated optical amplifier of claim 1, wherein the second control portion has a changeable time constant that is capable of being set to a selectable predetermined value.

* * * * *